United States Patent
Hassan et al.

(10) Patent No.: US 10,997,600 B1
(45) Date of Patent: May 4, 2021

(54) DATA TRANSACTION SCHEDULING USING CROWD-SOURCED NETWORK DATA

(71) Applicant: Microsoft Technology Licensing, LLC, Redmond, WA (US)

(72) Inventors: Amer Aref Hassan, Kirkland, WA (US); Michael Daum, Redmond, WA (US); Mahendra D. Sekaran, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/715,737

(22) Filed: Dec. 16, 2019

(51) Int. Cl.
*H04W 48/18* (2009.01)
*G06Q 20/40* (2012.01)
*G06Q 20/32* (2012.01)
*H04W 64/00* (2009.01)
*H04W 4/02* (2018.01)
*H04W 4/029* (2018.01)

(52) U.S. Cl.
CPC ....... *G06Q 20/405* (2013.01); *G06Q 20/3224* (2013.01); *H04W 4/023* (2013.01); *H04W 4/029* (2018.02); *H04W 64/006* (2013.01)

(58) Field of Classification Search
CPC ............ G06Q 20/405; G06Q 20/3224; H04W 84/005; H04W 36/08; H04W 36/32; H04W 48/17; H04W 48/18; H04W 48/20; H04W 4/001; H04W 4/021; H04W 4/023; H04W 4/027; H04W 4/029; H04W 64/003; H04W 64/006; H04W 36/14; H04W 24/02; H04W 24/04
See application file for complete search history.

(56) References Cited

U.S. PATENT DOCUMENTS

| | | | |
|---|---|---|---|
| 7,433,929 B2 | 10/2008 | Guilford et al. |
| 8,532,061 B2 | 9/2013 | Li et al. |
| 8,826,459 B2 | 9/2014 | Swist |
| 8,862,736 B2 | 10/2014 | Tagg |

(Continued)

FOREIGN PATENT DOCUMENTS

WO 2019083686 A1 5/2019

OTHER PUBLICATIONS

Lu et al., "Distance-Based Opportunistic Mobile Data Offloading", 2016, MDPI Journals, 11 pages. (Year: 2016).*

(Continued)

*Primary Examiner* — Quoc Thai N Vu
(74) *Attorney, Agent, or Firm* — Schwegman Lundberg & Woessner, P.A.

(57) ABSTRACT

Techniques for efficiently performing data transactions are disclosed herein. In an example, crowd-sourced data is used to generate a network map that includes network properties mapped to one or more geographical locations. The network map is used to determine if a network that has one or more target properties is within a threshold range of a computing device. The target properties are based on one or more parameters of an upcoming data transaction. If a respective network with one or more target properties is within range of the computing device, the upcoming data transaction can be scheduled for initiation when the computing device is connected to the respective network. If no networks have the one or more target properties, the upcoming transaction can be initiated using a current network connection.

20 Claims, 6 Drawing Sheets

(56) References Cited

U.S. PATENT DOCUMENTS

| | | | |
|---|---|---|---|
| 9,635,486 | B2 | 4/2017 | Ford et al. |
| 2005/0193145 | A1 | 9/2005 | Brown et al. |
| 2008/0075056 | A1 | 3/2008 | Thome |
| 2014/0094208 | A1 | 4/2014 | Egner et al. |
| 2014/0274043 | A1* | 9/2014 | Das ............... G01S 5/0236 455/434 |
| 2015/0056960 | A1 | 2/2015 | Egner et al. |
| 2016/0205693 | A1* | 7/2016 | Lu ................. H04W 48/18 370/329 |
| 2016/0212675 | A1* | 7/2016 | Choi .............. H04L 67/12 |
| 2019/0306781 | A1* | 10/2019 | Do ................. H04W 4/021 |

OTHER PUBLICATIONS

"Wi-Fi Offload—Yesterday, Today & Tomorrow", Retrieved from: https://www.techmahindra.com/sites/ResourceCenter/White%20Papers/Industries/Telecom/WiFi_Offload.pdf, Retrieved Date: Sep. 25, 2019, 18 Pages.

Agrawal, et al., "Intelligent Wireless Channel Selection", Application as Filed in U.S. Appl. No. 15/943,569, filed Apr. 2, 2018, 36 Pages.

Saunders, et al., "Broadband Application", In Peer-Reviewed Journal on the Internet, vol. 15, Issue 11, Nov. 5, 2012, 23 Pages.

"International Search Report and the Written Opinion Issued in PCT Application No. PCT/US20/059141", dated Feb. 1, 2021, 13 Pages.

\* cited by examiner

DATA TRANSACTION SCHEDULING USING CROWD-SOURCED NETWORK DATA

TECHNICAL FIELD

This document pertains generally, but not by way of limitation, to network transactions, and particularly but not by way of limitation to scheduling data transactions for computing devices based on network availability and quality.

BACKGROUND

Computing devices may execute several applications, each of which may execute many separate data transactions to communicate data to other computing devices, such as servers, personal computing devices, and the like. Various network types exist that allow these computing devices to perform these data transactions, including various wired and wireless networks.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Systems and methods are disclosed herein that utilize crowd-sourced network maps indicative of one or more network properties for various geographical locations to facilitate scheduling of network transactions to offload various transactions based on network availability. An upcoming network transaction (data communication, voice communication, etc.) can be identified by one or more software applications, for example, and one or more parameters of the transaction can be identified. Based on the identified parameters of the transaction, a target network property can be selected that is most desirable for the identified transaction.

A crowd-sourced network map may be used to determine the networks available within a range of the computing device. The range may be geographical, temporal, or any other indicator of the relation between a network and the computing device. In an example, a determination of whether the computing device is currently within a connection range of a network that has the target network property or properties can be made and, if so, the computing device may connect to the respective network and perform the transaction. In another example, a predicted time may be determined until the computing device is within connection range of a network that has one or more target network properties.

A determination of whether any network that matches the target network property is within a threshold range of the computing device may first be made and if so, the time until the computing device is within connection range of the respective network may be estimated. If the estimated time is less than a threshold time period, the transaction may be scheduled/offloaded for a time in which the computing device will be in connection range of the respective network. For example, it may be desirable for an email transmission to be delayed for a few minutes to offload, but if a desired connection is greater than two hours away, then the computing device may choose not to offload the transaction. Following expiration of the threshold time period, if the computing device is not yet within connection range of the respective network, the transaction can be initiated using a network that the computing device is currently connected to, for example.

A technical problem arises in that networks are physically limited by various properties including channel availability, channel quality, download speeds, upload speeds, bandwidth, latency, and the like. In networks with low bandwidth, for example, initiating a large data transaction can be detrimental to users of the network as the data transaction may utilize most of the network resources for the duration of the transaction. In networks with relatively high latency, for example, initiating an online communication can be undesirable for users as delays in network traffic may interrupt and otherwise create a difficult communication between users. A technical solution to these technical problems is realized by using a network map as described above to schedule data transactions for networks with target properties, which has the technical effect of improving network traffic and computational load for respective networks.

To further illustrate this technical problem, technical solution, and technical effect, performing a very large data synchronization using a low bandwidth or low speed network, for example, can take an undesirable amount of time and create unnecessarily high network traffic. This is especially undesirable when the data synchronization is not urgent. In solving the technical problem by both determining, using a network map, that a better-suited network is or will be available, and offloading the data synchronization for when the computing device is connected to the better-suited network, the technical effect of reducing the network load on the currently connected network and the computational load on the computing device is achieved.

Figure 1:
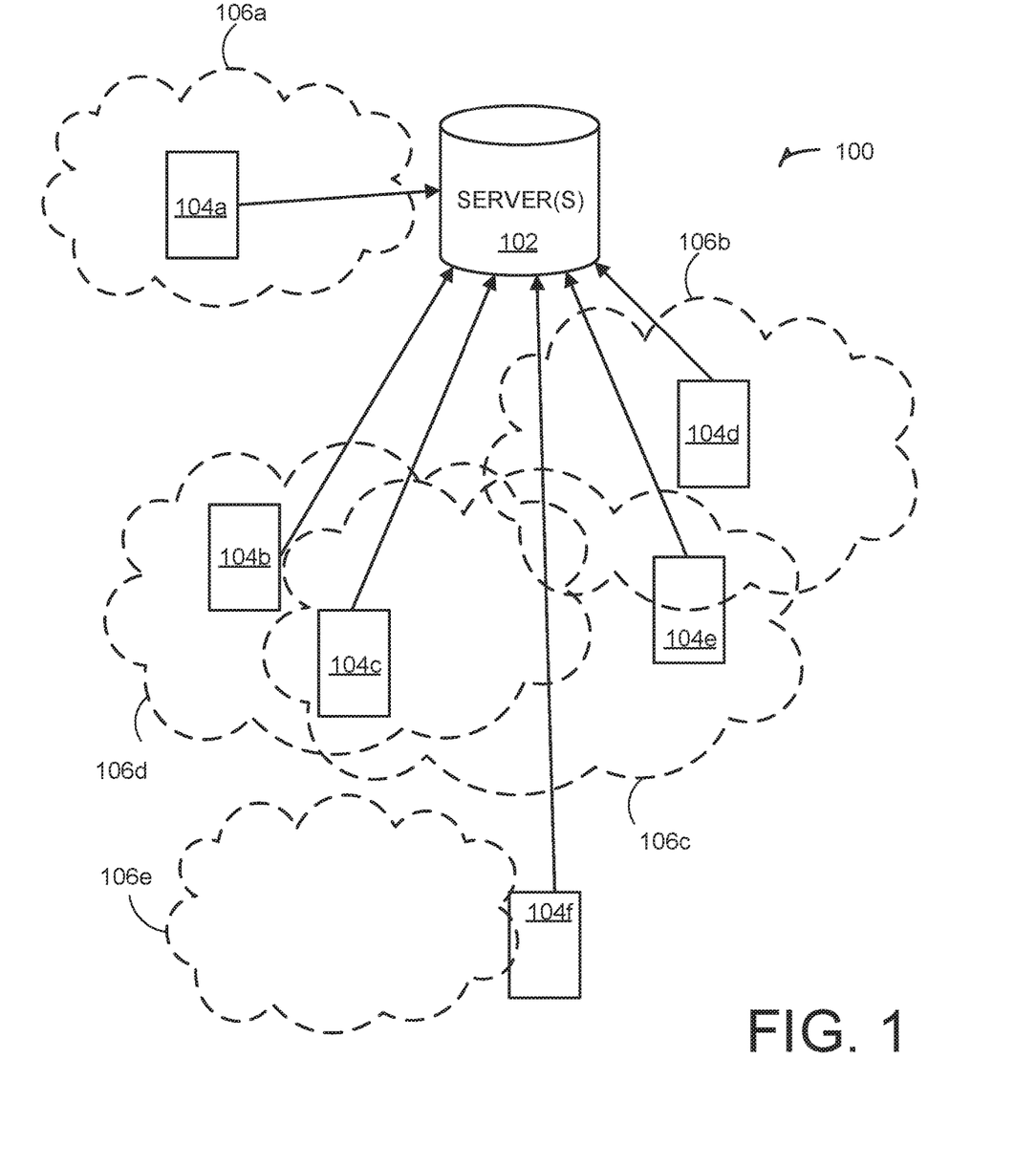
FIG. 1 is a diagram illustrating an example system for crowd-sourcing network data.

FIG. 1 is a diagram illustrating an example system 100 for crowd-sourcing network data. The system 100 includes one or more servers 102 and user devices 104a-104f accessing one or more networks 106a-106e. The user devices 104a-104f may be any user devices located at one or more geographical locations while accessing the one or more networks 106a-106e. The networks 106a-106e may be cellular networks, local area networks, wide area networks, or any other wired or wireless networks. For example, the networks 106a-106e may include one or more 3rd generation (3G), 4th generation (4G), long term evolution (LTE), 5th generation (5G) or any other cellular network, networks according to the Institute of Electrical and Electronics Engineers (IEEE) 802.11 family of standards known as Wi-Fi®, or any other network. While illustrated as five networks 106a-106e and six user devices 104a-104e, any number of user devices may provide data regarding any number of networks.

The user devices 104*a*-104*f* may be configured to communicate with the servers 102 through any connection, including wired and wireless connections. Each user device 104*a*-104*f*, which may be a phone, tablet, laptop, wearable device or other personal computing device, may be configured to upload data to, and download data from, the servers 102. Each user device 104*a*-104*f* may upload to the servers 102 current location data along with data that includes one or more network properties regarding one or more of the networks 106*a*-106*e*. These network properties can include, for example, network type, channel availability, channel quality, network availability, network download speeds, network upload speeds, voice availability, voice quality, network bandwidth, network accessibility, network trust level, network latency, and the like. The user devices 104*a*-104*f* may communicate the network properties to the servers 102 through the respective networks 106*a*-106*e* for which the respective user device 104*a*-104*f* is reporting, or through another network. For example, a user device may report voice connection availability to the servers 102 over a data connection. The data may be uploaded to the servers 102 in real time or may be stored by a respective user device 104*a*-104*f* and uploaded to the servers 102 at a later time. The user devices 104*a*-104*f* may also upload contextual data with the network properties. The contextual data may specify a context in which the network properties were obtained. This context may be temporal, for example, specifying a time of day, day of the week, date, season, or the like, or may include other contextual data such as traffic conditions, weather conditions, travel velocity, device properties, and the like.

The servers 102 may include one or more applications configured to collect the network data from the user devices 104*a*-104*f* and compile a "crowd-sourced" network map for one or more geographical areas. For example, the network data may be provided to the servers 102 along with current geographical information, such as latitude and longitude coordinates. For example, device 104*c* may be in a geographical location capable of accessing both networks 106*c* and 106*d* and thus may provide geographical coordinates as well as data regarding the networks 106*c* and 106*d*. While both devices 104*d* and 104*e* are able to connect to network 106*b*, the device 104*d* may be receive a better connection as the device 104*e* is located at the edge of the network 106*b*. Thus, the geographical data received from the user devices 104*a*-104*f* may be used to determine the range and service area of each network 106*a*-106*e*. Therefore, in an example, the network map may be a model of the networks 106*a*-106*e* stored in a database to indicate network availability with respect to geographical coordinates for specific networks 106*a*-106*e*. The data can be grouped into geographical areas of any size based on the coordinates, such as city blocks, building structures, sections of a highway, or any other specified geographical area.

Figure 2:
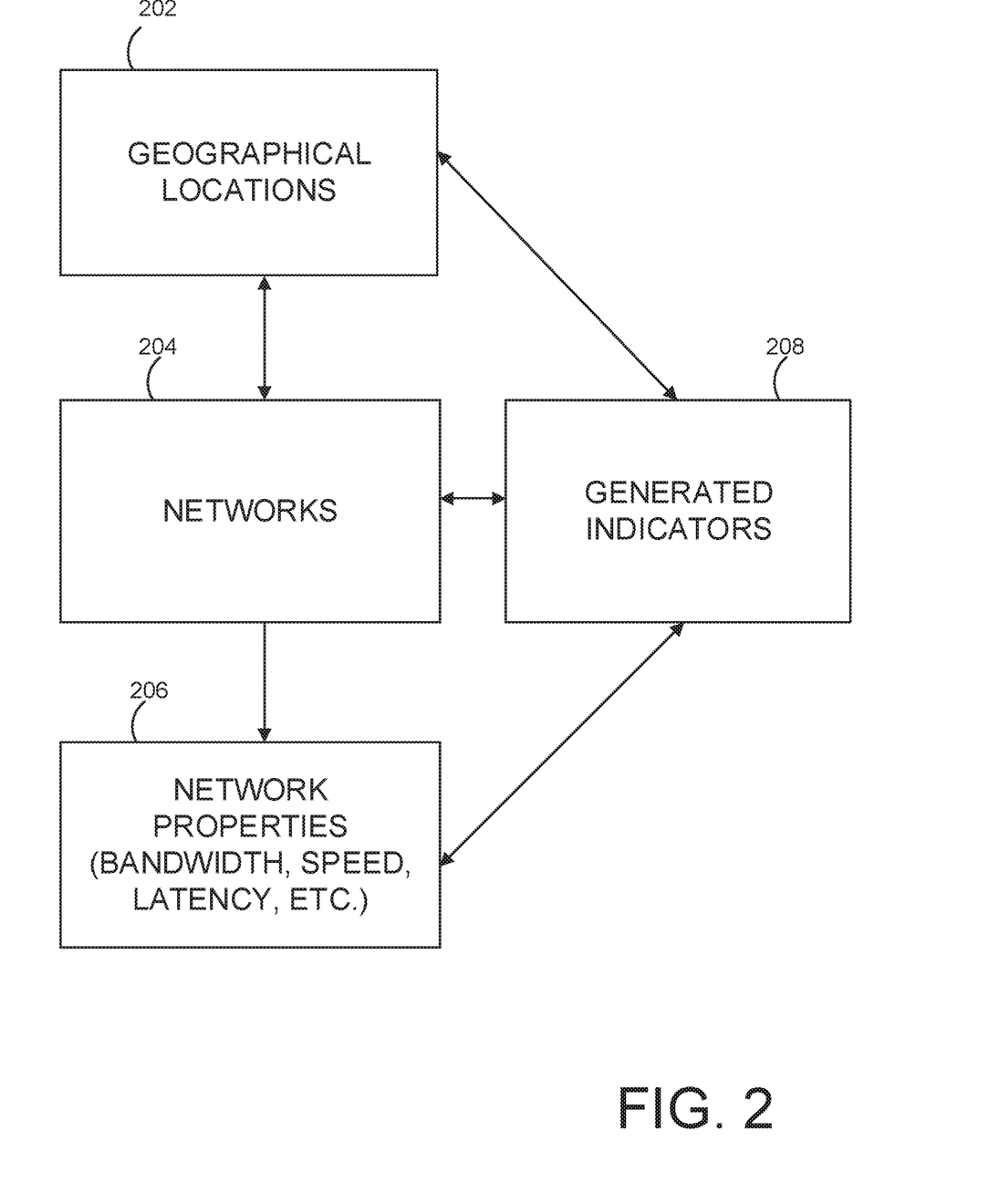
FIG. 2 is a logical diagram illustrating a network map generated using crowd-sourced network data.

FIG. 2 is a logical diagram illustrating a network map 200 generated using crowd-sourced network data. The network map may store and map geographic locations 202, network identifiers 204, and network properties 206, for example. In other examples, further crowd-sourced data may be stored related to the one or more networks, including indicators 208. The geographic locations 202 can include coordinates (such as latitude and longitude), and/or indications of geographic areas such as city blocks, parcels of land, structures, portions of highway, or any other geographically defined area.

The geographic locations 202 may map to one or more networks 204. For example, if a network is available for a specific geographic location, the respective network can be mapped to that geographic location (and/or that geographic location can be mapped to that network). The networks 204 may include data such as network identifiers allowing unique identification of a network. Each one of the networks 204 can also map to one or more network properties. The properties can include network type, network availability, channel availability, channel stability, channel strength, bandwidth, trust level, accessibility, speed, throughput, latency, quality indicator, and the like.

The information for the network map 200 may be stored in one or more databases in any desirable format. The network map 200 may be generated by the servers 102 or any other computing system using the crowd-sourced data received from the user devices 104*a*-104*f*. The network map may also generate and store indicators 208 generated by the servers 102 regarding the geographical locations 202, networks 204, and/or properties 206. In one example, the indicators 208 may include context data mapping one or more contexts to one or more network properties. For example, the context data may be temporal, mapping the network properties to a time of day, day of the week, data, season, or the like. The context data may also indicate non-temporal context, such as power data, traffic conditions, weather conditions, device properties, travel velocities, and the like.

Figure 3:
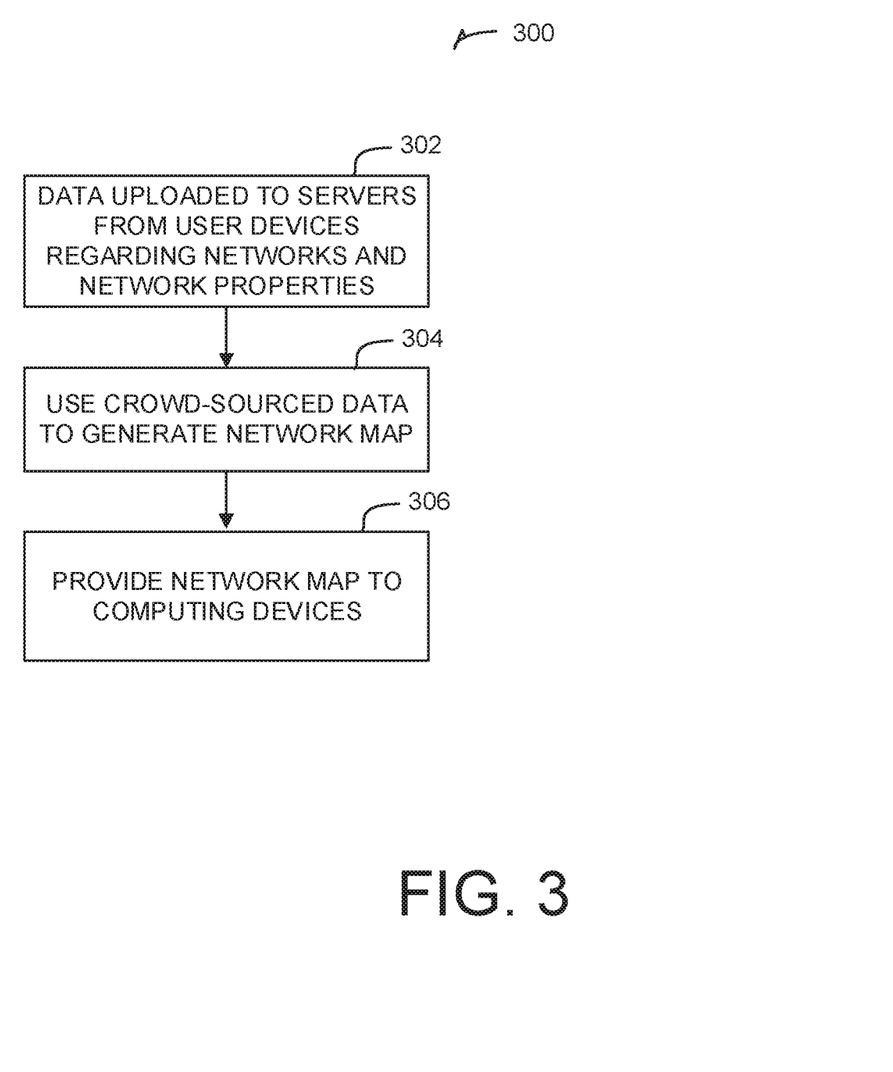
FIG. 3 is a flowchart illustrating a method of generating a network map using crowd-sourced network data.

FIG. 3 is a flowchart illustrating a method 300 of generating a network map. The method 300 can be executed by the servers 102, a user device 104*a*-104*f*, or any other computing system. At step 302, user devices, such as phones, tablets, laptops, wearable devices, and other user devices, upload information regarding one or more properties, capabilities, and/or performance indicators of a network for which a respective user device is connected. For example, a user device may be connected to a cellular network and using a cellular voice connection and/or a cellular data connection. In another example, the user device may be connected to a local area network or wide area network using any wireless protocol such as the IEEE 802.11 family of standards known as Wi-Fi® or any other network standard. In other examples, the device may be connected to another type of network, including wired networks. In some examples, the user device may provide information regarding one or more properties of networks and/or channels for which the respective user device is not connected. For example, such information may include service-set-identifiers (SSIDs) and signal strengths of nearby Wi-Fi® networks. The properties can also specify or distinguish between different sub-types of network protocols. For example, a network may operate according to WiGig® (802.11ad standard operating at 60 GHz), Wi-Fi® operating according to 802.11ac, 802.11ax, 802.11n or the like.

A respective user device may provide the device's geographical location, the cellular or other network to which the device is connected, a connection quality, and other properties regarding the respective network. The device's location may be provided using geographic coordinates, such as latitude and longitude using a global navigation system such as the Global Positioning System (GPS), for example, an area descriptor, such as an intersection of two roads, or any other geographic data indicative of a device location such as a structure. The connection quality may be a signal-to-noise ratio, an indication regarding successful connection, or any other indicator of connection quality. The user device may provide similar data regarding voice connection quality, bandwidth, trust level, accessibility, latency, or any other property. In some examples, the device may provide a current navigational route the user device is travelling that was entered by the user.

At step 304, the collected data is used to generate a network map. The network map can take any form that allows mapping of network properties for a network to geographic locations. The network map data may be stored in one or more databases, for example, in any database storage format. Indicators may be generated using the uploaded user data, such as general network availability indicators for a geographical area. At step 306, a portion of, or the entire generated network map can be provided to other computing devices for use in planning network connections, for example. In one example, only the portion of the network map within a range of a respective computing device may be provided to the respective computing device. The range may be temporal, geographical, or any other relationship between the computing device and the networks. For example, only networks within a geographical distance may be provided, only networks within a maximum travel time may be provided, or the like.

Figure 4:
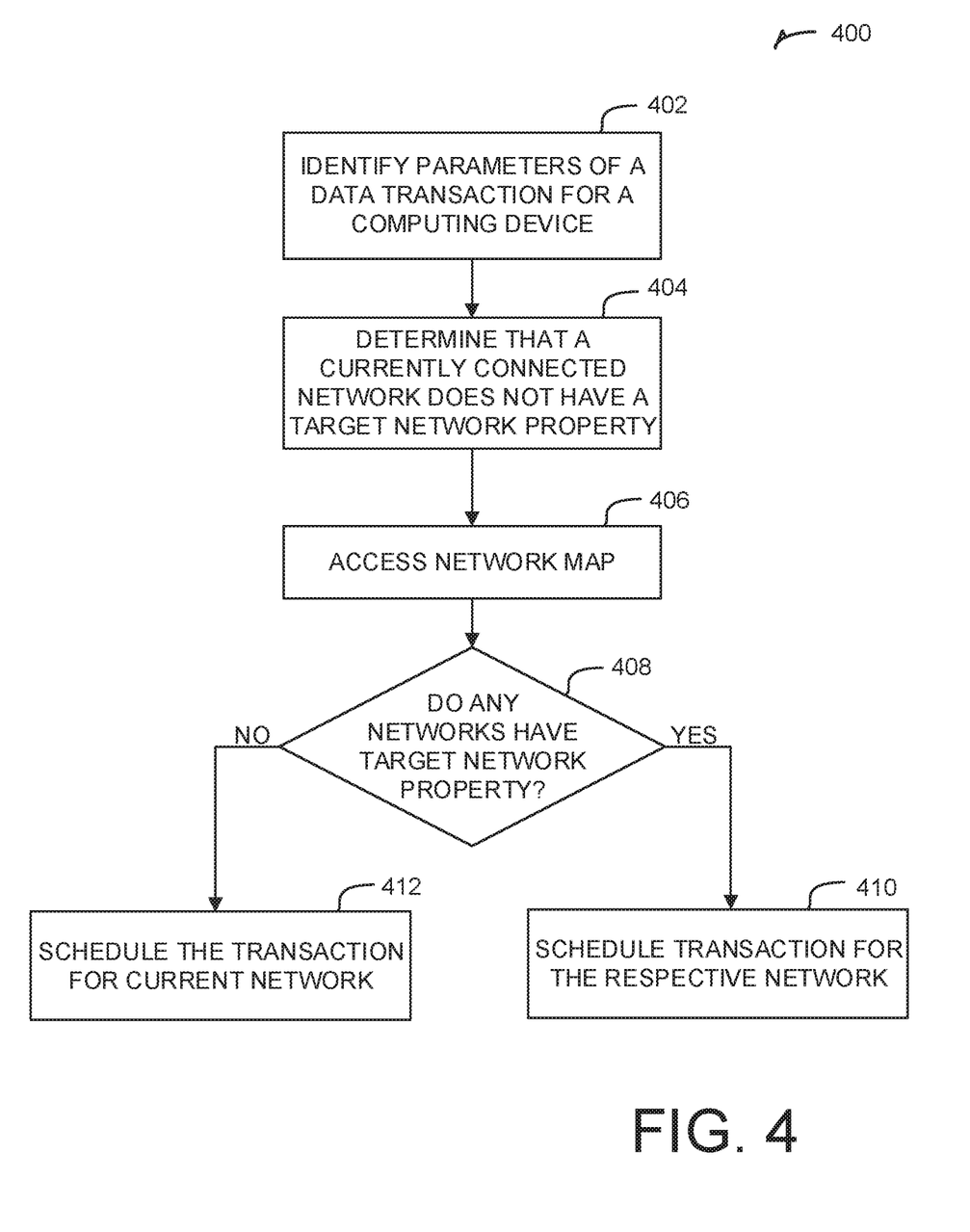
FIG. 4 is a flowchart illustrating a method of scheduling network transactions using a network map.

FIG. 4 is a flowchart illustrating a method 400 for scheduling network transactions using a network map, such as the network map 200. At step 402, a data transaction is identified by a respective computing device, such as any of the computing devices 104a-104f, for example. The data transaction may be identified using one or more applications running on the respective computing device. The data transaction may be for the respective application, or may be for a different application running on the computing device. The data transaction may be any data communication, voice communication, and the like. The data communication may be packet-based or utilize any other form of communicating data bits over a network connection. For example, an application may be executing on the computing device that wants to perform a data synchronization operation to synchronize data between the computing device and one or more servers. The application performing the synchronization, or a separate application, may identify the data synchronization as an upcoming transaction.

One or more parameters of the upcoming transaction can be identified to determine one or more target network properties for the upcoming transaction. The parameters may include a transaction size, transaction type, or the like. A transaction type may specify a broad categorization of transaction, such as a data synchronization, voice communication, video stream, audio stream, data upload, or the like. The transaction type may also include several sub-tiers of transaction types. For example, a main tier of transaction type may be data streaming, a first sub-tier may be standard-definition video streaming, and a second sub-tier may be high-definition (e.g., 4K) video streaming. The transaction type can also indicate a security level or data sensitivity level. For example, the transaction type may indicate that a particular transaction is highly sensitive, while another transaction has no data sensitivity and thus, appropriate for public networks. The transaction size may be broad and indicate a relative size, such as a large, medium, small, or the like. The transaction size may also be specific, for example, indicating an approximate total byte size of the transaction. Other parameters may also be identified in addition to the transaction size and type.

At step 404, a determination is made as to whether a currently connected network has a target network property or properties. The currently connected network is any network to which the respective computing device is connected. For example, a mobile phone may be currently connected to a cellular data network or other wireless network, such as an LTE network. The target network property may be any network property including bandwidth, trust level, speed, throughput, latency, network availability, channel availability, channel stability, channel strength, or the like. For example, if the upcoming transaction is a large data synchronization, high bandwidth may be desirable, while low latency may be less important. Thus, a threshold bandwidth may be selected as the target network property for the upcoming transaction. In an example, the threshold bandwidth may be selected such that certain types of Wi-Fi® networks, such as a WiGig® network, may match the target property, while other types of Wi-Fi® networks, such as a Wi-Fi® network according to the 802.11ac protocol, may not. In another example, the threshold bandwidth may be such that all Wi-Fi® networks match the target property while an LTE network does not. In another example, the upcoming transaction may be a voice call such that the target network property may be less than a threshold latency. In another example, the upcoming transaction may be an email message that contains sensitive data and thus, the target network property is a threshold trust level of the network.

In one example, the transaction parameters may be used to index into a lookup table, database, or other data structure to obtain the one or more target network properties based on the transaction parameters. For example, a size of the transaction may be used to index into the data structure which may provide a threshold bandwidth and/or a threshold network speed as the target network property. The data structure may be stored on the computing device and/or one or more servers. In an example, the computing device may transmit the parameters of the upcoming transaction and the server may utilize the data structure to obtain the network property. In another example, the target network property or properties may be determined using a machine-learning model that predicts the target properties based upon the transaction parameters used as input.

At step 406, the network map is accessed to determine if any networks have properties that match the target network property. In an example, a portion of a larger network map may be accessed such that the portion of the network map only includes networks within a threshold range of the respective computing device. The range may be a distance range, a temporal range, or the like. For example, the range may be networks within a threshold distance of the geographic location of the computing device or may be networks within one hour estimated travel time of the computing device. The servers may access the network map or may provide the network map, or a portion of the network map, to the respective computing device to access.

At step 408, a determination is made as to whether one of the networks indicated by the network map matches the target network property for the upcoming data transaction. For example, if one of the networks is a WiGig® network and the upcoming transaction is a large data synchronization in which the target network property is high bandwidth, then the network can be indicated as matching the target network property. If one of the networks has a property that matches the target network property, method 400 proceeds to step 410, and if none of the networks have a property that matches the target network property, method 400 proceeds to step 412. In some examples, multiple properties may be used for the determination. For example, the target properties may include both a threshold bandwidth and a threshold network quality indicator. If no networks match both target properties, then the method 400 would proceed to step 412.

In some examples, multiple levels of network properties may be taken into consideration. For example, a first level network property may be a high bandwidth such as is satisfied by a WiGig® network, for example. If no networks match that property, a second level network property may be used as the target property. For example, a second level property may be a lower bandwidth such as is satisfied by any Wi-Fi® network. This may be desirable as a second level network may still provide a better option for the upcoming transaction than a current network. Any number of levels for network properties may be used when accessing the network map to match a target network property.

At step 410, the upcoming transaction is scheduled for execution when the respective computing device is connected to the network that has one or more properties that matches the target network property. In some examples, the network with the matching property may be presently available for connection. If so, the respective computing device can immediately connect to the respective network and perform the transaction or can wait to connect to the respective network. For example, the computing device may be currently performing other transactions that are more efficiently executed using a currently connected network. The computing device may therefore wait until those transactions are completed to connect to the new network to perform the upcoming transaction.

The network with the matching property may not be currently available. In this case, a prediction may be made (as discussed below with respect to FIG. 5) as to if and when the network may be in connection range. If a determination is made that the network will be in connection range within a threshold time period, the upcoming transaction can be scheduled for a time when the computing device can connect to the respective network.

At step 412, the upcoming transaction, if possible, is performed using a currently connected network. This may be due to a determination that no networks indicated by the network map match the target network property or properties or may be a determination that a network that does match the target network property or properties is not within a threshold range of the computing device. Additionally, if the computing device is not currently connected to a network, the upcoming transaction can be scheduled to execute when the computing device is next connected to a network.

Figure 5:
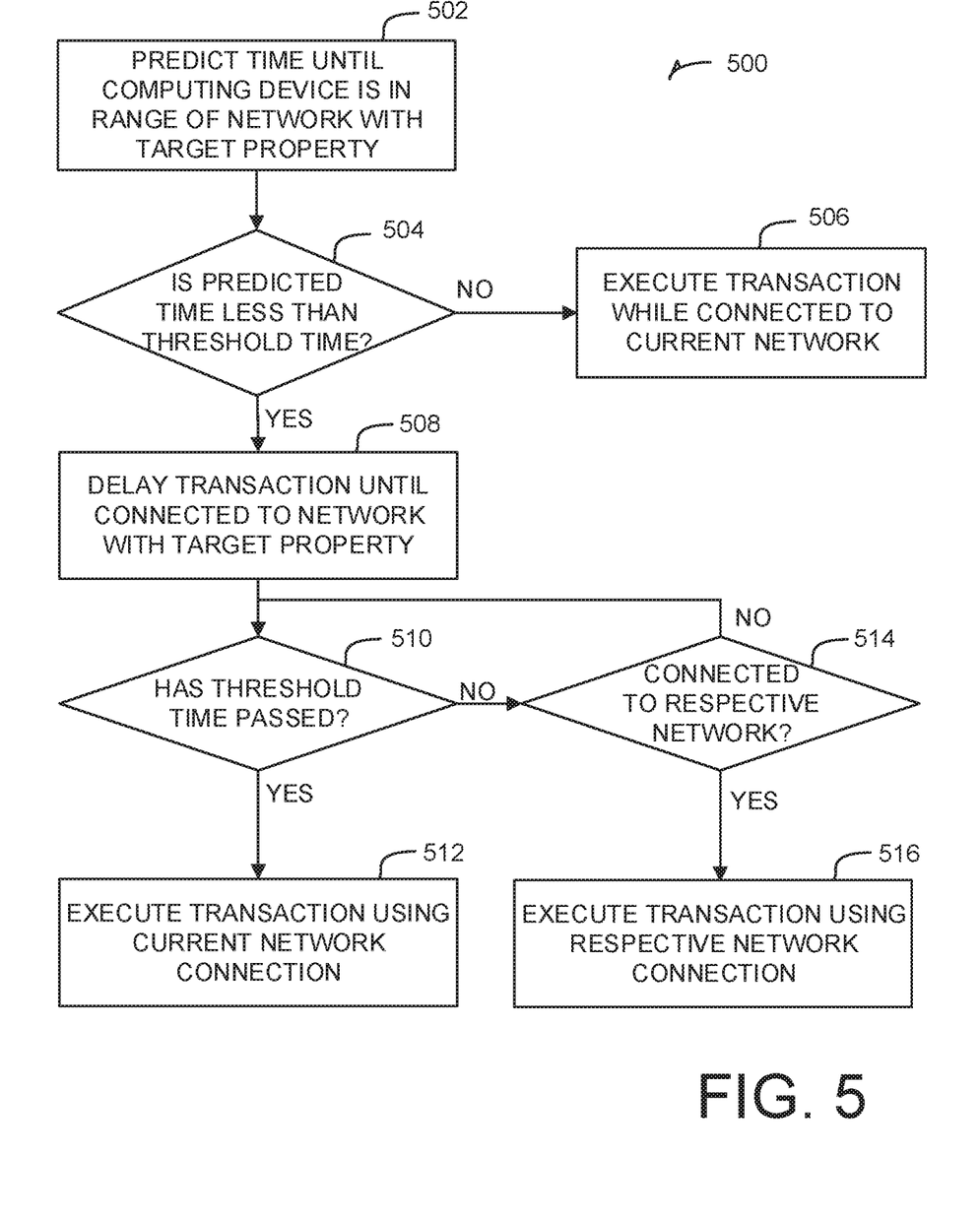
FIG. 5 is a flowchart illustrating another method of scheduling network transactions using a network map.

FIG. 5 is a flowchart illustrating another method 500 of scheduling network transactions using a network map. The method 500 may be used to replace steps 408-412 of method 400, for example. At step 502, the network map has been accessed and one of the networks has a property or properties that match the target network property. A time is predicted as to when the respective computing device will be in connectable range of the respective network. For example, a determination may be made that a respective network is two hours from the computing device. This determination may be made based on context of the computing device, such as a current travel speed, time of day, geographical location, historical data, and the like.

In some examples, the predicted time may be based upon a user's calendar. For example, if the calendar shows a business meeting, the system may infer that the user will be in range of a business network, such as a Wi-Fi® network within a building of the business. In other examples, the prediction may be based upon a machine-learning model that predicts the computing device's future location based upon one or more indicators. Example indicators may include the current geographical location, the time of day, day of the week, day of the year, a planned driving route, a calendar of the user (e.g., showing one or more meetings), one or more previous activities of the user, and the like. Past user behavior data may be used to train the machine-learning model. Example machine-learning algorithms may include logistic regression, neural networks, decision forests, decision jungles, boosted decision trees, support vector machines, and the like. When predicting a time, current indicators for the computing device may be applied to the model, and the model may make a prediction of the future location(s) of the device.

At step 504, a determination is made as to whether the predicted time is less than a threshold time. The threshold time may be any time under which it is desirable to delay the upcoming transaction for offload. For some transactions, such as large data synchronizations, the threshold time may be 24 hours or longer. For other transactions, the threshold time may be much shorter, such as one hour or less. If the predicted time is greater than the threshold time, method 500 proceeds to step 506 and executes the transaction using the currently connected network. If the predicted time is less than the threshold time, the method 500 proceeds to step 508 and delays the transaction until the computing device is connected to the respective network.

Even though a predicted time is less than the threshold time, the computing device may not actually come into connection range of the respective network within the threshold time. At step 510, a determination is made as to whether the threshold time has elapsed. If the threshold time has elapsed, the method 500 proceeds to step 512. If the threshold time has not elapsed, the method 500 proceeds to step 514. At step 512, the transaction is executed using a current network connection. At step 514, a determination is made as to whether the computing device has connected to the respective network. If the computing device has connected to the respective network, the method proceeds to step 516 and executes the transaction. If the computing device has not connected to the respective network, the method 500 returns to step 510.

Figure 6:
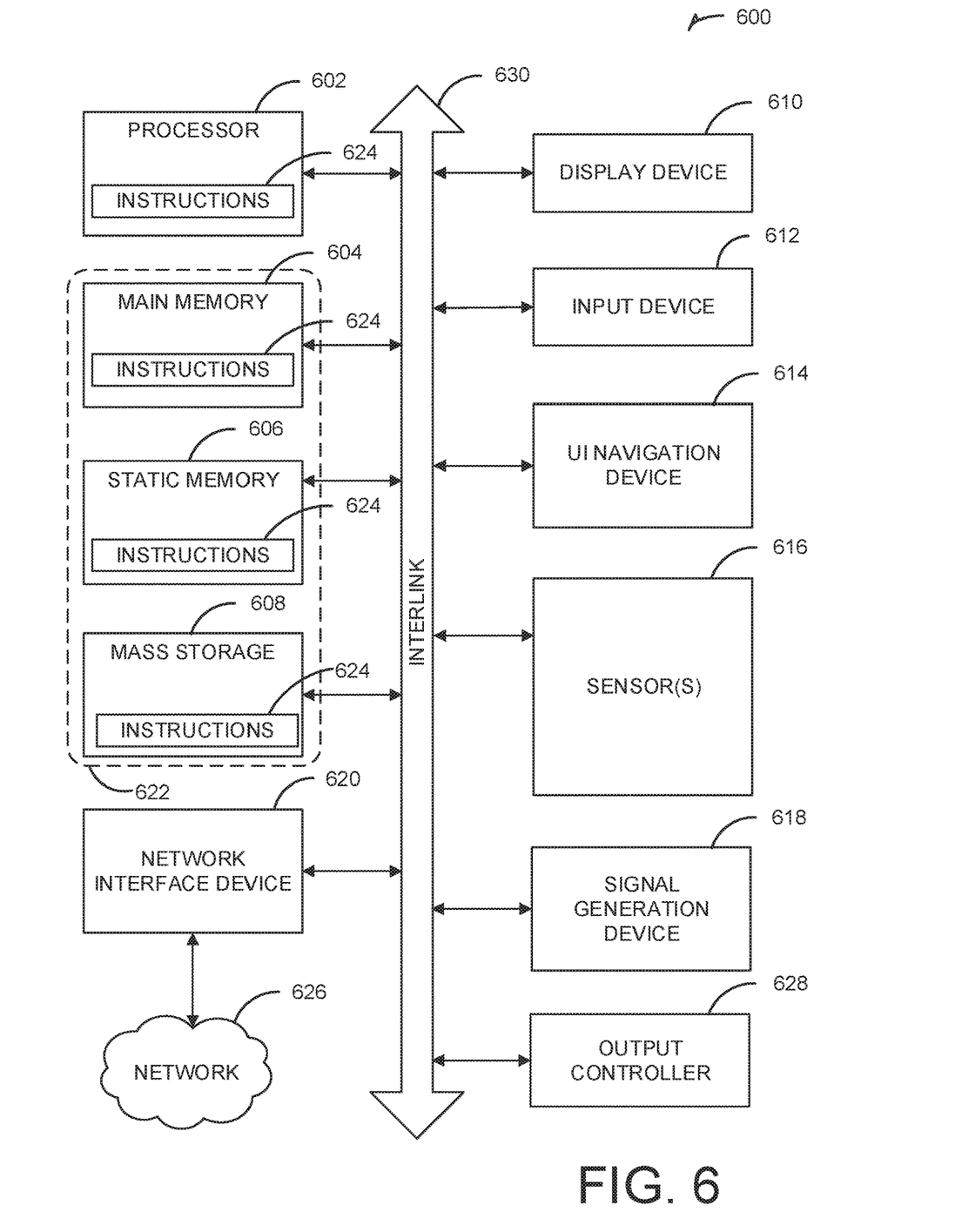
FIG. 6 is a block diagram illustrating an example of a machine upon which one or more embodiments may be implemented.

FIG. 6 illustrates a block diagram of an example machine 600 upon which any one or more of the techniques (e.g., methodologies) discussed herein may perform. For example, the machine 600 can be any one or more of the servers 102, and/or user devices 104a-104f. Examples, as described herein, may include, or may operate by, logic or a number of components, or mechanisms in the machine 600. Circuitry (e.g., processing circuitry) is a collection of circuits implemented in tangible entities of the machine 600 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 600 follow.

In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 600 may include a hardware processor 602 (e.g., a central processing unit (CPU), a graphics processing unit (GPU), a hardware processor core, or any combination thereof), a main memory 604, a static memory (e.g., memory or storage for firmware, microcode, a basic-input-output (BIOS), unified extensible firmware interface (UEFI), etc.) 606, and mass storage 608 (e.g., hard drive, tape drive, flash storage, or other block devices) some or all of which may communicate with each other via an interlink (e.g., bus) 630. The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 608, a signal generation device 618 (e.g., a speaker), a network interface device 620, and one or more sensors 616, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 602, the main memory 604, the static memory 606, or the mass storage 608 may be, or include, a machine readable medium 622 on which is stored one or more sets of data structures or instructions 624 (e.g., software) embodying or utilized by any one or more of the techniques or functions described herein. The instructions 624 may also reside, completely or at least partially, within any of registers of the processor 602, the main memory 604, the static memory 606, or the mass storage 608 during execution thereof by the machine 600. In an example, one or any combination of the hardware processor 602, the main memory 604, the static memory 606, or the mass storage 608 may constitute the machine readable media 622. While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may be further transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.16.4 family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software. A transmission medium is a machine readable medium.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A system for efficiently performing data transactions, the system comprising:
   one or more hardware processors;
   one or more memory units, storing instructions, which when executed, cause the one or more hardware processors to perform operations comprising:
   identifying parameters of a first data transaction to be initiated by a computing device, the parameters including at least a transaction type or a transaction size;
   determining that a current network to which the computing device is connected does not have a target network property based on the parameters of the first data transaction;
   accessing a network map that identifies a plurality of networks available within a first threshold range of the computing device;
   identifying a match between the target network property and a property of one of the plurality of networks;
   scheduling the first data transaction, to be initiated by the computing device when the computing device is connected to the one of the plurality of networks, based on a determination that the one of the plurality of networks is within a second threshold range of the computing device; and
   scheduling the first data transaction, to be initiated by the computing device when the computing device is connected to the current network, based on a determination that the one of the plurality of networks is not within the second threshold range of the computing device.

2. The system of claim 1, wherein the operations of scheduling the first data transaction to be initiated by the computing device comprises:
   determining a geographic location of the computing device;
   predicting, using the network map, an estimated time until the computing device is within connectable range of the one of the plurality of networks; and
   scheduling the first data transaction to be initiated by the computing device when the computing device is connected to the one of the plurality of networks based on a determination that the estimated time is less than a threshold time period.

3. The system of claim 2, the operations further comprising:
   initiating the data transaction using the current network based on a determination that the computing device has not connected to the one of the plurality of networks within the threshold time period; and
   initiating the data transaction using the one of the plurality of networks based on a determination that the computing device has connected to the one of the plurality of networks within the threshold time period.

4. The system of claim 1, the operations further comprising:
   identifying parameters of a second data transaction, wherein the parameters of the second data transaction are different than the parameters of the first data transaction; and
   initiating the second data transaction when the computing device is connected to the current network based on the parameters of the second data transaction.

5. The system of claim 1, wherein the operations of accessing the network map comprises:
   requesting, by the computing device, the network map from one or more servers; and
   receiving the network map from the one or more servers.

6. The system of claim 1, wherein:
   the operations of identifying parameters of the first data transaction comprises receiving, by one or more servers, the parameters of the first data transaction from the computing device; and
   the operations of scheduling the first data transaction, to be initiated by the computing device when the computing device is connected to the one of the plurality of networks, comprises instructing, by the one or more servers, the computing device to schedule the first data transaction.

7. The system of claim 6, the operations further comprising:
   receiving network data for the plurality of networks from one or more user devices located within a geographical area; and
   generating the network map based on the network data received from the one or more user devices.

8. The system of claim 1, wherein the network property is at least one of bandwidth, speed, or latency, and wherein the data transaction is at least one of a data synchronization, voice communication, video stream, audio stream, or data upload.

9. The system of claim 1, wherein the first threshold range and the second threshold range are each one of a geographical distance threshold or a threshold travel time.

10. A method of efficiently performing data transactions, the method comprising:
 identifying parameters of a first data transaction to be initiated by a computing device, the parameters including at least a transaction type or a transaction size;
 determining that a current network to which the computing device is connected does not have a target network property based on the parameters of the first data transaction;
 accessing a network map that identifies a plurality of networks available within a first threshold range of the computing device;
 identifying a match between the target network property and a property of one of the plurality of networks;
 scheduling the first data transaction, to be initiated by the computing device when the computing device is connected to the one of the plurality of networks, based on a determination that the one of the plurality of networks is within a second threshold range of the computing device; and
 scheduling the first data transaction, to be initiated by the computing device when the computing device is connected to the current network, based on a determination that the one of the plurality of networks is not within the second threshold range of the computing device.

11. The method of claim 10, wherein scheduling the first data transaction to be initiated by the computing device when the computing device is connected to the one of the plurality of networks based on the determination that the one of the plurality of networks is within the second threshold range of the computing device comprises:
 determining a geographic location of the computing device;
 predicting, using the network map, an estimated time until the computing device is within range of the one of the plurality of networks; and
 scheduling the first data transaction to be initiated by the computing device when the computing device is connected to the one of the plurality of networks based on a determination that the estimated time is less than a threshold time period.

12. The method of claim 11, further comprising:
 initiating the data transaction using the current network based on a determination that the computing device has not connected to the one of the plurality of networks within the threshold time period.

13. The method of claim 11, further comprising:
 initiating the data transaction using the one of the plurality of networks based on a determination that the computing device has connected to the one of the plurality of networks within the threshold time period.

14. The method of claim 10, further comprising:
 identifying parameters of a second data transaction, wherein the parameters of the second data transaction are different than the parameters of the first data transaction; and
 initiating the second data transaction when the computing device is connected to the current network based on the parameters of the second data transaction.

15. The method of claim 10, wherein accessing the network map comprises:
 requesting, by the computing device, the network map from one or more servers; and
 receiving the network map from the one or more servers.

16. The method of claim 10, wherein:
 identifying parameters of the first data transaction comprises receiving, by one or more servers, the parameters of the first data transaction from the computing device; and
 scheduling the first data transaction, to be initiated by the computing device when the computing device is connected to the one of the plurality of networks, comprises instructing, by the one or more servers, the computing device to schedule the first data transaction.

17. The method of claim 16, further comprising operations of:
 receiving network data for the plurality of networks from one or more user devices located within a geographical area; and
 generating the network map based on the network data received from the one or more user devices.

18. The method of claim 10, wherein the network property is at least one of bandwidth, speed, or latency, and wherein the data transaction is at least one of a data synchronization, voice communication, video stream, audio stream, or data upload.

19. The method of claim 10, wherein the first threshold range and the second threshold range are each one of a geographical distance threshold or a threshold travel time.

20. A system comprising:
 means for identifying parameters of a first data transaction to be initiated by a computing device, the parameters including at least a transaction type or a transaction size;
 means for determining that a current network to which the computing device is connected does not have a target network property based on the parameters of the first data transaction;
 means for accessing a network map that identifies a plurality of networks available within a first threshold range of the computing device;
 means for identifying a match between the target network property and a property of one of the plurality of networks;
 means for scheduling the first data transaction, to be initiated by the computing device when the computing device is connected to the one of the plurality of networks, based on a determination that the one of the plurality of networks is within a second threshold range of the computing device; and
 means for scheduling the first data transaction, to be initiated by the computing device when the computing device is connected to the current network, based on a determination that the one of the plurality of networks is not within the second threshold range of the computing device.

* * * * *